(12) United States Patent
Hoffman et al.

(10) Patent No.: US 6,695,893 B2
(45) Date of Patent: Feb. 24, 2004

(54) CONTINUOUS FLOW DRYER RESERVOIR MODULE DRYER SYSTEM

(75) Inventors: Fred W. Hoffman, Columbia Station, OH (US); Charles E. Eberling, Wellington, OH (US); Leonard A. Quinn, Lagrange, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 10/113,327

(22) Filed: Mar. 29, 2002

(65) Prior Publication Data

US 2003/0183077 A1 Oct. 2, 2003

(51) Int. Cl.$^7$ .......................... B01D 53/26; B01D 53/04
(52) U.S. Cl. .................. 95/21; 95/19; 95/117; 95/122; 96/113; 96/130; 96/133; 96/144; 55/DIG. 17
(58) Field of Search ................ 34/80, 332; 55/DIG. 17; 95/19, 21, 22, 117–119, 121, 122; 96/113, 114, 130, 133, 143, 144

(56) References Cited

U.S. PATENT DOCUMENTS

| | | | | |
|---|---|---|---|---|
| 3,242,650 A | * | 3/1966 | Crawford | 96/113 |
| 3,311,454 A | * | 3/1967 | Kemeny et al. | 422/86 |
| 3,561,464 A | * | 2/1971 | Sher et al. | 137/625.38 |
| 3,572,008 A | * | 3/1971 | Hankison et al. | 95/105 |
| 3,592,563 A | * | 7/1971 | Glass et al. | 417/167 |
| 4,071,337 A | * | 1/1978 | Evans | 96/114 |
| 4,487,617 A | * | 12/1984 | Dienes et al. | 96/113 |
| 4,673,419 A | * | 6/1987 | Kojima | 96/144 |
| 4,685,941 A | * | 8/1987 | Sato | 96/114 |
| 4,713,094 A | * | 12/1987 | Yanagawa et al. | 96/147 |
| 4,721,515 A | | 1/1988 | Hata et al. | |
| 4,806,134 A | * | 2/1989 | Lhota | 96/114 |
| 4,812,148 A | * | 3/1989 | Hata et al. | 96/114 |
| 5,110,327 A | * | 5/1992 | Smith | 96/113 |
| 5,186,522 A | * | 2/1993 | Spencer | 303/1 |
| 5,286,283 A | * | 2/1994 | Goodell | 96/113 |
| 5,378,266 A | * | 1/1995 | Elamin | 96/114 |
| 5,427,609 A | * | 6/1995 | Zoglman et al. | 95/98 |
| 5,522,150 A | * | 6/1996 | Schultz | 34/80 |
| 5,575,541 A | * | 11/1996 | Elamin | 303/1 |
| 5,592,754 A | * | 1/1997 | Krieder et al. | 34/527 |
| 5,607,500 A | * | 3/1997 | Shamine et al. | 96/144 |
| 5,715,621 A | * | 2/1998 | Mitsch | 34/80 |
| 5,917,139 A | | 6/1999 | Goodell et al. | 96/113 |
| 6,074,177 A | * | 6/2000 | Kobayashi et al. | 417/313 |
| 6,074,462 A | | 6/2000 | Quinn et al. | 96/113 |
| 6,077,330 A | * | 6/2000 | Sabelstrom | 95/11 |
| 6,120,107 A | * | 9/2000 | Eslinger | 303/1 |
| 6,125,553 A | | 10/2000 | Quinn et al. | 34/332 |
| 6,132,496 A | * | 10/2000 | Petit et al. | 96/108 |
| 6,171,371 B1 | * | 1/2001 | Derive et al. | 95/98 |
| 6,200,365 B1 | * | 3/2001 | Eimer et al. | 95/19 |
| 6,391,098 B1 | * | 5/2002 | Thomas | 96/111 |
| 6,425,935 B1 | * | 7/2002 | Amato et al. | 95/1 |

FOREIGN PATENT DOCUMENTS

WO    WO 99/43527 A1    9/1999

* cited by examiner

Primary Examiner—Robert H. Spitzer
(74) Attorney, Agent, or Firm—Calfee, Halter & Griswold LLP

(57) ABSTRACT

A continuous flow dryer system for compressed air includes first and second air dryers for receiving and alternately drying compressed air from a source. The dried air from the first dryer is transmitted to the second dryer. First and second reservoirs store the dried compressed air. A plurality of control valves in the second air dryer are used for distributing the dried air to the respective reservoirs.

27 Claims, 2 Drawing Sheets

CONTINUOUS FLOW DRYER RESERVOIR MODULE DRYER SYSTEM

BACKGROUND OF THE INVENTION

The present invention relates to compressed fluid systems for vehicles. It finds particular application in conjunction with systems utilizing a pair of air dryers for removing moisture from compressed air and will be described with particular reference thereto. It will be appreciated, however, that the invention is also amenable to other like applications.

Transit coaches and air-assisted bulk-off load units are illustrative of compressed air systems used for operating brakes and accessories (e.g., tire inflation systems) of vehicles (e.g., heavy-duty trucks, tractors, trailers, or tractor-trailer combinations). Known air dryers cannot meet the demands of these systems. More specifically, a desiccant material in the air dryer becomes overwhelmed and saturated, ultimately resulting in loss of function.

Continuous flow air dryers are used for air brake vehicle applications where high air use calls for extended charging times and high compressor duty cycles. Continuous flow systems, therefore, typically use a pair of air dryers between a source of compressed air and a storage reservoir. By occasionally purging air to exhaust from an air dryer, the dryer (specifically, the desiccant material) is regenerated and is more effective in removing moisture during its next duty cycle. Accordingly, switching arrangements that alternate the pair of air dryers between charging the reservoir and purging (e.g., one air dryer is regenerated while the other air dryer supplies dry air to the reservoir) have been developed.

In current systems that alternate a pair of air dryers between charge and purge modes, the dried air from each of the dryers is transmitted to a common reservoir (e.g., a wet tank) before being distributed to a plurality of storage reservoirs. The wet tank includes pressure protection means for ensuring one of the reservoirs maintains a minimum threshold of pressure if another one of the tanks is depressurized due to, for example, a leak.

Additionally, the dryers are mounted to a module that controls the modes of the respective dryers. Such configurations require heavy and/or bulky bracketry for securing the dryers to the control module. The weight of the brackets may negatively affect vehicle performance. Furthermore, the size of the brackets consume a significant critical space along the vehicle frame.

The present invention provides a new and improved apparatus and method which address the above-referenced problems.

SUMMARY OF THE INVENTION

A continuous flow dryer system for compressed air includes a plurality of air dryers for alternately drying compressed air from a source. The dried air from a first of the dryers is transmitted to a second of the dryers before being distributed to a plurality of reservoirs via a plurality of respective control valves in the second air dryer.

In one embodiment of the invention, the continuous flow dryer system for compressed air includes first and second air dryers for alternately drying compressed air from a source. The dried air from the first dryer is transmitted to the second dryer. First and second reservoirs store the dried compressed air. A plurality of control valves in the second air dryer are used for distributing the dried air to the respective reservoirs.

In one aspect of the invention, the first and second dryers are mounted to the first and second reservoirs, respectively.

In another aspect of the invention, the control valves open for distributing the air as a function of a pressure in the second dryer relative to the pressures in the respective reservoirs.

In another aspect of the invention, the control valves are pressure on valves.

In another aspect of the invention, the control valves are electronically controlled valves.

In another aspect of the invention, the pressure in the second dryer required for opening the control valves becomes lower as the pressures in the respective reservoirs increase.

In another aspect of the invention, a pressure controller senses the pressure in the second dryer. If the pressure in the second dryer is below a pressure controller threshold, the pressure controller causes the source to deliver pressurized air to the dryers. If the pressure in the second dryer is one of equal and above the pressure controller threshold, the pressure controller causes the source to cease delivering pressurized air to the dryers.

In another aspect of the invention, a control module causes the dryers to alternate between a dry cycle and a regeneration cycle such that one of the dryers is in the dry cycle when the other dryer is in the regeneration cycle.

In another aspect of the invention, each of the reservoirs includes a purge chamber. A portion of the dried air is channeled to the purge chambers and is used during the regeneration cycles of the dryers.

In another aspect of the invention, a third reservoir receives and stores the dried compressed air from the second dryer. Each of the reservoirs is used in conjunction with a respective compressed air system.

In another embodiment of the present invention, a compressed air dryer system includes a first reservoir for storing compressed air, a first air dryer incorporated into the first reservoir, and a means for channeling the compressed dried air from the first dryer to the first reservoir. The compressed air is dried by the first dryer before being stored in the first reservoir.

In another embodiment of the present invention, a compressed air dryer system includes a first reservoir for storing compressed air and a first air dryer secured to the first reservoir. The compressed air is dried by the first dryer before being stored in the first reservoir. A first control valve controls a flow of the compressed dried air from the first dryer to the first reservoir.

In another embodiment of the present invention, a mechanism for compensating for a depressurization of a reservoir in a compressed air system includes a first reservoir for storing compressed air. A first air dryer is secured to the first reservoir. The compressed air is dried by the first dryer before being stored in the first reservoir. A first control valve opens for channeling the compressed dried air from the first dryer to the first reservoir as a function of respective pressures in the first dryer and the first reservoir.

BRIEF DESCRIPTION OF THE DRAWING

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENTS

Figure 1:
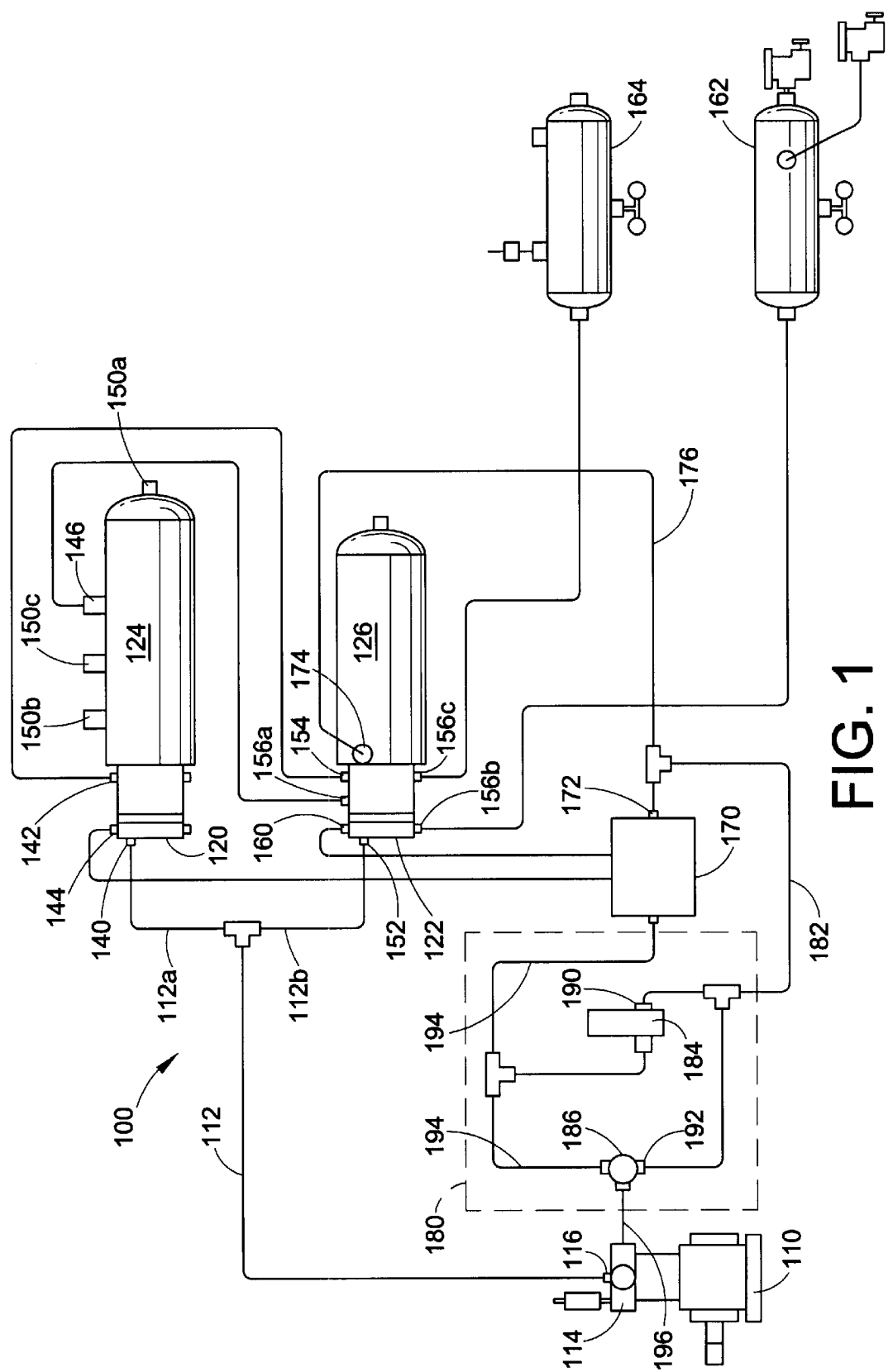
FIG. 1 illustrates an exemplary diagram of a continuous flow dryer system in accordance with one embodiment of the present invention.

Illustrated in FIG. 1 is an exemplary diagram of a continuous flow dryer system 100 for compressed air in one embodiment of the present invention. The system 100 includes an air compressor 110, which is typically powered by an engine of an automotive vehicle with which the system is associated. A reciprocating-type compressor having a rotating crankshaft is typically used. However, it is to be understood that any other type of known compressor may be incorporated into the system without departing from the scope and intent of the present invention.

The compressor 110 delivers pressurized air to a supply line 112 via a port 116. To prevent damage to the compressor 110, a safety valve 114 vents the pressurized air from the compressor 110 to atmosphere if the supply line 112 is blocked. Disposed in the supply lines 112a, 112b are first and second air dryers 120, 122, respectively. As illustrated, the dryers 120, 122 are disposed so that fluid (e.g., air) flowing through the supply line 112 may pass through either one or both of the air dryers 120, 122. In one embodiment, the first dryer 120 is mounted (e.g., secured) to a first reservoir 124 (e.g., a primary reservoir), and the second dryer 122 is mounted to a second reservoir 126 (e.g., a secondary reservoir). It is also contemplated in another embodiment that the dryers 120, 122 be integrated into the reservoirs 124, 126. The first and second reservoirs 124, 126 include respective purge chambers 130, 132 (see FIG. 2). The purge chambers 130, 132 communicate with the dryers 120, 122 via respective passages 134, 136 (see FIG. 2) and orifices 324, 326 (see FIG. 2).

The first dryer 120 includes a supply port 140, which communicates with the air compressor 110, a delivery port 142, and a control terminal 144. The first reservoir 124 includes a supply port 146 and a plurality of delivery ports 150 for delivering compressed air from the first reservoir to various compressed air systems within, for example, a vehicle. In the illustrated embodiment, the first reservoir 124 includes three (3) delivery ports 150a, 150b, 150c. However, in other embodiments, it is contemplated that the first reservoir 124 include any other number of delivery ports.

The second dryer 122 includes a supply port 152, which communicates with the air compressor 110, a receiving port 154, which communicates with the delivery port 142 of the first dryer 120, a plurality of delivery ports 156, and a control terminal 160. In the illustrated embodiment, the second dryer 122 includes four (4) delivery ports 156a, 156b, 156c, 156d for delivering compressed air from the second dryer 122 to the second reservoir 126 and various compressed air systems within, for example, a vehicle. However, in other embodiments, it is contemplated that the second dryer 122 include any other number of delivery ports. The delivery port 156a communicates with the supply port 146 of the first reservoir 124. Additional reservoirs 162, 164 communicate with the second dryer 122 via the delivery ports 156b, 156c. Although two (2) additional reservoirs 162, 164 are illustrated, it is to be understood that any number of additional reservoirs are contemplated. The second reservoir 126 communicates with the second dryer 122 via an internal passage 166 (see FIG. 2)and the delivery port 156d (see FIG. 2).

In one embodiment, the first and second reservoirs 124, 126 are used for braking systems within a vehicle. For example, the first and second reservoirs 124, 126 are used for braking rear and front wheels, respectively, of the vehicle. Furthermore, the additional reservoirs 162, 164 are used for supplying compressed air to auxiliary systems on the vehicle. For example, a tire inflation system may draw compressed air from the reservoir 162, while another auxiliary system may draw compressed air from the reservoir 164.

The structure and operation of the dryers 120, 122 and the reservoirs 124, 126 is discussed in more detail below with reference to FIG. 2.

A continuous flow module 170 supplies control signals to the control terminals 144, 160. More specifically, the module 170 causes the dryers 120, 122 to alternately dry air received via the supply line 112. In other words, the module 170 alternates each of the dryers 120, 122 between a dry cycle (mode) and a regeneration cycle (mode). Furthermore, the module 170 ensures one of the dryers (e.g., the dryer 120) is in the dry cycle while the other dryer (e.g., the dryer 122) is in the regeneration cycle. During the regeneration cycle, the air in one of the purge chambers 130, 132 is used for drying a desiccant in its respective dryer 120, 122.

An input port 172 of the module 170 communicates with an output port 174 of the second dryer 122. In this manner, a pressure at the output port 174 is communicated to the input port 172 via a line 176. The same pressure is also transmitted to a pressure controller 180 via a line 182. In one embodiment, the pressure controller 180 includes a governor 184 and a valve 186 for amplifying the effects of the governor 184. More specifically, supply ports 190, 192 of the governor 184 and the valve 186, respectively, receive the pressure from the line 182. Control lines 194 communicate control signals to the module 170 and valve 186. Furthermore, the valve 186 communicates a control signal to unloaders of the compressor 110 via a control line 196.

Figure 2:
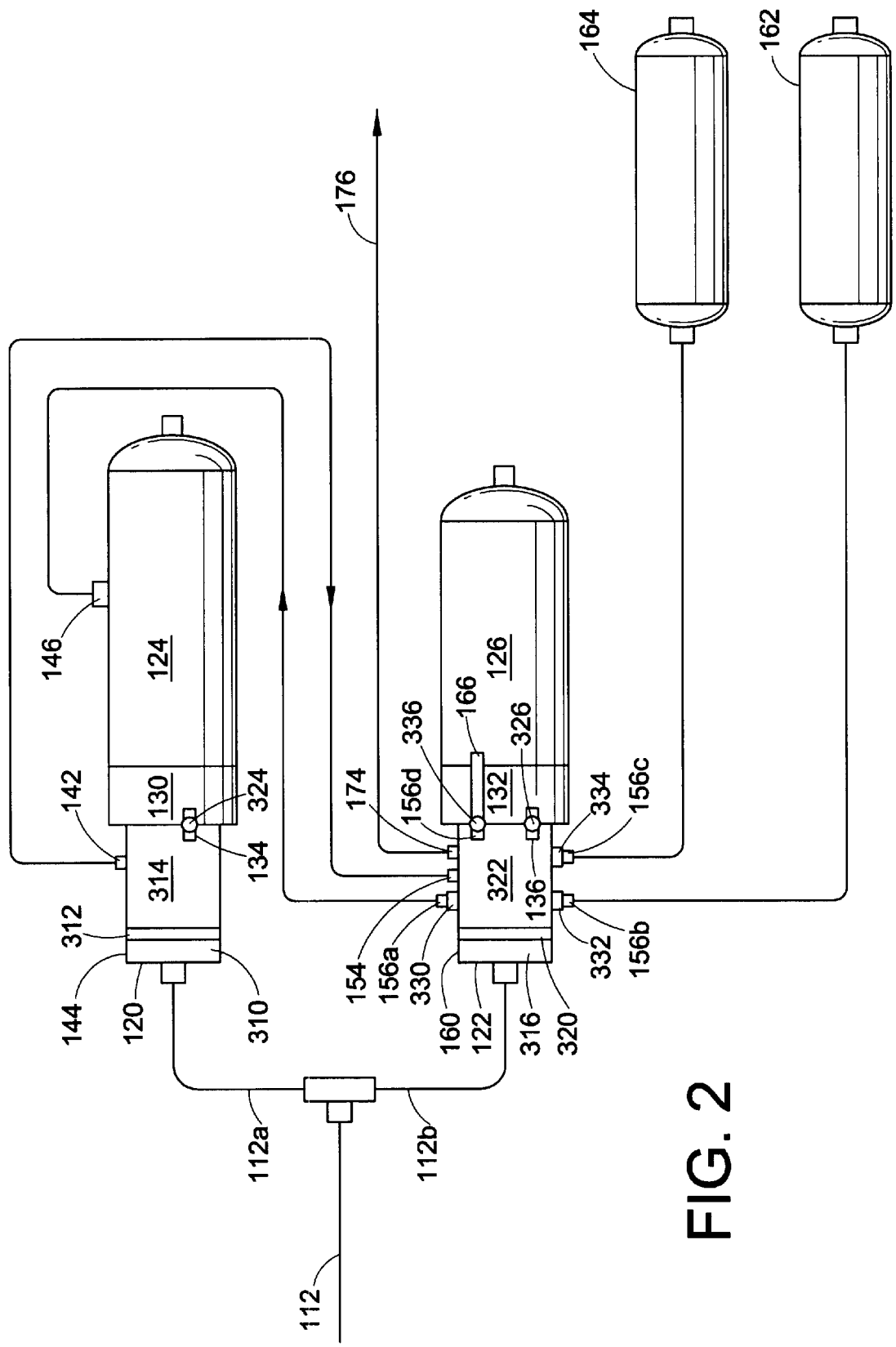
FIG. 2 is a schematic diagram of the dryers and the reservoirs in accordance with one embodiment of the present invention.

Illustrated in FIG. 2 is a diagram highlighting the dryers 120, 122 and the reservoirs 124, 126, 162, 164 in one embodiment of the present invention. FIG. 2 is merely a schematic diagram intended to illustrate the functional operation of the dryers. U.S. Pat. Nos. 5,917,139 and 6,074,462, which are incorporated herein by reference, illustrate the structural features of a typical air dryer. With reference to FIG. 2, the supply line 112 feeds compressed air into the dryers 120, 122 via the parallel supply lines 112a, 112b, respectively. The dryer 120 includes an air drying section 310, which includes a desiccant material 312, and an air distribution section 314. Similarly, the second dryer 122 includes an air drying section 316, which includes a desiccant material 320, and an air distribution section 322.

Compressed air entering the drying sections 310, 316 from the supply lines 112a, 112b, respectively, is assumed to be unconditioned (e.g., the compressed air in the supply line 112 may contain an unacceptable level of moisture). Therefore, once the compressed air enters the dryers 120, 122, the moisture level in the compressed air is reduced to an acceptable level within the drying sections 310, 316. More specifically, the drying sections 310, 316 include components (not shown) in addition to the desiccant materials 312, 320 for drying the compressed air according to known methods. Therefore, after passing through the desiccant materials 312, 320 and into the distribution chambers 314, 322, the compressed air is assumed to be conditioned (e.g., dried to an acceptable level).

A portion of the conditioned air received into the distribution chamber 314 passes into the purge chamber 130 via the orifice 324 in the passage 134 when the dryer 120 is not in the regeneration cycle; then, during the regeneration cycle, the orifice 324 allows compressed air to pass from the purge chamber 130 into the distribution section 314 for regenerating the desiccant 312. It is to be understood the purge chamber 132 stores a portion of the conditioned compressed air entering the distribution chamber 322 via the passage 136 and the orifice 326 for regenerating the desiccant material 320 in a similar manner.

The portion of the conditioned compressed air in the distribution chamber 314 that does not pass into the purge chamber 130 is channeled into the distribution chamber 322 via the ports 142, 154. Therefore, the distribution chamber 322 includes conditioned pressurized air from both the first and second dryers 120, 122.

Control valves 330, 332, 334, 336 are positioned in the ports 156a, 156b, 156c, 156d, respectively. In one embodiment the control valves are contemplated to be pressure protection valves. However, in other embodiments, the control valves are also contemplated to be electronically controlled valves (e.g., solenoids) controlled by electronic logic circuits. The pressurized air in the distribution chamber 322 is upstream to each of the control valves 330, 332, 334, 336. Therefore, the control valves 330, 332, 334, 336 act as means for distributing the conditioned compressed air in the distribution chamber 322 to the first reservoir 124, the additional reservoirs 162, 164, and the second reservoir 126, respectively. In other words, the control valves 330, 332, 334, 336 control a flow of the conditioned compressed air from the distribution chamber 322 to the first reservoir 124, the additional reservoirs 162, 164, and the second reservoir 126, respectively.

The control valves 330, 332, 334, 336 distribute the conditioned compressed air from the distribution chamber 322 to the first reservoir 124, the additional reservoirs 162, 164, and the second reservoir 126, respectively, as a function of a pressure in the distribution section 322 relative to pressures in the respective reservoirs 124, 126, 162, 164. More specifically, higher pressures in the reservoirs 124, 126, 162, 164 cause the control valves 330, 332, 334, 336, respectively, to open when less pressure is present in the distribution chamber 322. Each of the control valves 330, 332, 334, 336 operates independently of the other control valves 330, 332, 334, 336. Therefore, a leak in any of the reservoirs 124, 126, 162, 164 causes the control valve 330, 332, 334, 336 associated with that reservoir to close while the other valves 330, 332, 334, 336 may remain open.

For purposes of illustration, each of the control valves 330, 332, 334, 336 may be set to open when an upstream pressure is about 106 ±3 pounds/inch$^2$ ("psi"and the respective downstream pressures in the reservoirs 124, 126, 162, 164 is about zero (0) psi. In this case, the valves 330, 332, 334, 336 remain closed until the pressure in the distribution section 322 builds to about 106±3 psi. More specifically, one or more of the valves 330, 332, 334, 336 may open between about 103 psi and about 106 psi while the other valves open between about 106 psi and about 109 psi. Once a first of the valves (e.g., 330) opens, the pressure in the distribution section 322 drops as the associated reservoir (e.g., the first reservoir 124) fills with the dried compressed air. After the first of the reservoirs (e.g., the first reservoir 124) reaches about 106±3 psi, a second of the valves (e.g., 332) opens. Then, the pressures in the first reservoir 124 and the distribution section 322 drop as the associated reservoir (e.g., the second reservoir 126) fills with the dried compressed air. This process repeats until all of the reservoirs 124, 126, 162, 164 reach a desired maximum pressure (e.g., a cut-off pressure of about 130±5 psi).

Once all of the reservoirs reach the desired maximum pressure (e.g., all the reservoirs have a pressure ≧ about 130±5 psi), the control valves 330, 332, 334, 336 remain open unless any of the downstream pressures (e.g., the pressures in the reservoirs 124, 126, 162, 164) drops below a predetermined closing pressure (e.g., about 90 psi). For example, one of the reservoirs may be depressurized due to a leak; for this reason the closing pressure is also referred to as a leak threshold. Furthermore, the pressure controller 180 (see FIG. 1) (e.g., the governor 184 (see FIG. 1)) causes the compressor 110 (see FIG. 1) to cease delivering pressurized air to the dryers 120, 122 (see FIG. 1).

If any of the reservoirs (e.g., 124) depressurizes due, for example, to a leak and all of the control valves 330, 332, 334, 336 are open, pressurized air is lost from all of the reservoirs 124, 126, 162, 164. More specifically, pressure is lost from the first reservoir 124 because of the leak; furthermore, pressure is lost from the other reservoirs 126, 162, 164 via the distribution section 322 and the first reservoir 124. Once any of the control valves 330, 332, 334, 336 detect pressures in the reservoirs 124, 126, 162, 164 below the closing pressure, the respective valves 330, 332, 334, 336 close. In this case, the pressure controller 180 (e.g., the governor 184 (see FIG. 1)) senses the pressure in the distribution section 322 is below a predetermined governor threshold level, and the valve 186 (see FIG. 1) causes the compressor 110 (see FIG. 1) to charge and create more pressurized air.

Once the compressed air is dried and enters the distribution section 322, the process described above begins again to attempt to fill the reservoirs 124, 126, 162, 164 up to approximately an opening pressure of the control valve (e.g., 330) associated with the reservoir 124 having the leak. As discussed above, higher pressures in any of the reservoirs 124, 126, 162, 164 cause the respective control valves 330, 332, 334, 336 to open with less pressure in the distribution chamber 322. Therefore, because the pressure in the reservoir (e.g., 124) with the leak is about zero (0) psi and, furthermore, because there is still pressure (e.g., about 90 psi) in the other reservoirs (e.g., 126, 162, 164), the control valve (e.g., 330) associated with the reservoir (e.g., 124) only opens after all the other valves 332, 334, 336 have opened. Because the control valve 124 opens, even if only for a relatively short time, pressure in the surviving reservoirs (e.g., 126, 162, 164) is maintained between about the predetermined closing pressure (e.g., 90 psi) and about the opening pressure (e.g., 106±3 psi) of the control valve (e.g., 330) associated with the reservoir (e.g., 124). In this sense, the compressed air system compensates for the leak in the reservoir.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A method for distributing dried compressed air from a continuous flow dryer system to first and second storage reservoirs, the method comprising:

alternately drying compressed air in first and second dryers;

channeling the dried compressed air from the first dryer to the second dryer; and distributing the dried compressed air from the second dryer to the storage reservoirs via a plurality of respective control valves.

2. The method for distributing dried compressed air from a continuous flow dryer system as set forth in claim 1, wherein the first and second dryers are mounted to the first and second reservoirs, respectively, and each of the reservoirs includes a purge chamber, the method further including:

alternating the dryers between dry cycles and regeneration cycles, one of the dryers being in the dry cycle when the other dryer is in the regeneration cycle;

channeling a portion of the dried air from one of the dryers to the respective purge chamber of the reservoir to which the dryer is mounted during the drying cycles; and channeling the dried air from one of the purge chambers through a desiccant of the dryer mounted on the reservoir of the purge chamber during the regeneration cycles.

3. The method for distributing dried compressed air from a continuous flow dryer system as set forth in claim 1, wherein the distributing includes:

opening the control valves as a function of pressures in the second dryer and in the respective reservoirs.

4. The method for distributing dried compressed air from a continuous flow dryer system as set forth in claim 3, further including:

sensing the pressure in the second dryer;

if the pressure in the second dryer is below a predetermined threshold, delivering pressurized air from the source to the dryers; and if the pressure in the second dryer is one of equal and above the predetermined threshold, ceasing delivery of the pressurized air from the source to the dryers.

5. The method for distributing dried compressed air from a continuous flow dryer system as set forth in claim 1, further including:

distributing the dried compressed air from the second dryer to the third storage reservoir via a respective one of the control valves, the compressed air in each of the reservoirs being used in conjunction with a respective compressed air system.

6. A continuous flow dryer system for compressed air, comprising:

first and second air dryers for alternately drying compressed air from a source, the dried air from the first dryer being transmitted to the second dryer;

first and second reservoirs for storing the dried compressed air; and a plurality of control valves in the second air dryer for distributing the dried air to the respective reservoirs.

7. The continuous flow dryer system as set forth in claim 6, wherein the first and second dryers are mounted to the first and second reservoirs, respectively.

8. The continuous flow dryer system as set forth in claim 6, wherein the control valves open for distributing the dried air as a function of a pressure in the second dryer relative to the pressures in the respective reservoirs.

9. The continuous flow dryer system as set forth in claim 8, wherein the control valves are pressure protection valves.

10. The continuous flow dryer system as set forth in claim 8, wherein the control valves are electronically controlled valves.

11. The continuous flow dryer system as set forth in claim 8, further including:

a pressure controller sensing the pressure in the second dryer; wherein if the pressure in the second dryer is below a pressure controller threshold, the pressure controller causes the source to deliver pressurized air to the dryers; and wherein if the pressure in the second dryer is one of equal and above the pressure controller threshold, the pressure controller causes the source to cease delivering pressurized air to the dryers.

12. The continuous flow dryer system as set forth in claim 11, further including:

a control module for alternating the dryers between a dry cycle and a regeneration cycle and causing one of the dryers to be in the dry cycle when the other dryer is in the regeneration cycle.

13. The continuous flow dryer system as set forth in claim 12, wherein each of the reservoirs includes a purge chamber, a portion of the dried air being channeled to the purge chambers and being used during the regeneration cycles of the dryers.

14. The continuous flow dryer system as set forth in claim 8, wherein the pressure in the second dryer required for opening the control valves becomes lower as the pressures in the respective reservoirs increase.

15. The continuous flow dryer system as set forth in claim 6, further including:

a third reservoir for receiving and storing the dried compressed air from the second dryer, each of the reservoirs being used in conjunction with a respective compressed air system.

16. A compressed air dryer system, comprising:

a first reservoir for storing compressed air;

a first air dryers incorporated into the first reservoir, including a first drying section and a distribution section. the compressed air being dried by the first dryer before being stored in the distribution section;

a second reservoir for storing the compressed air;

a second air dryer. incorporated into the second reservoir, including a second drying section, the first and second dryers being alternately selected such that the compressed air is dried by one of the dryers before being stored in the reservoirs; and means for channeling the compressed dried air from the dryers to the reservoirs via the distribution section.

17. The compressed air system as set forth in claim 16, wherein the means for channeling includes:

a control valve.

18. The compressed air system as set forth in claim 17, wherein the control valve is a pressure protection valve.

19. The compressed air system as set forth in claim 16, wherein the means for channeling includes:

a plurality of control valves each being associated with one of the reservoirs.

20. The compressed air system as set forth in claim 19, wherein the control valves open for channeling the compressed dried air as a function of a pressure in the distribution section and of pressures in the respective reservoirs.

21. The compressed air system as set forth in claim 16, further including:

a third reservoir for storing the dried compressed air from the distribution section, the compressed air in the first and second reservoirs being used in conjunction with braking systems for a vehicle and the compressed air in the third reservoir being used in conjunction with a tire inflation system for the vehicle.

22. A compressed air dryer system, comprising:

a first reservoir for storing compressed air;

a first air dryer secured to the first reservoir, the compressed air being dried by the first dryer before being stored in the first reservoir; and a first control valve for controlling a flow of the compressed dried air from the first dryer to the first reservoir.

23. The compressed air system as set forth in claim 22, further including:

a second reservoir for storing the compressed air;

a second air dryer mounted to the second reservoir, the first and second dryers being alternately selected such that the compressed air is dried by one of the dryers before being stored in the reservoirs;

a second control valve for controlling a flow of the compressed dried air from the first dryer to the second reservoir; and wherein the compressed dried air from both of the dryers is supplied to the first dryer before being channeled to one of the first and second reservoirs.

24. The compressed air system as set forth in claim 22, wherein the control valve is a pressure protection valve.

25. A mechanism for compensating for a depressurization of a reservoir in a compressed air system, comprising:

a first reservoir for storing compressed air;

a first air dryer secured to the first reservoir, the compressed air being dried by the first dryer before being stored in the first reservoir; and a first control valve which opens for channeling the compressed dried air from the first dryer to the first reservoir as a function of respective pressures in the first dryer and the first reservoir.

26. The mechanism for compensating for a depressurization as set forth in claim 25, further including:

a second reservoir for storing the compressed air;

a second air dryer mounted to the second reservoir, the first and second dryers being alternately selected such that the compressed air is dried by one of the dryers, the compressed air dried by the second dryer being channeled to the first dryer; and a second control valve which opens for channeling the compressed dried air from the first dryer to the second reservoir as a function of respective pressures in the first dryer and the second reservoir.

27. The mechanism for compensating for a depressurization as set forth in claim 26, wherein if the pressure in one of the reservoirs drops below a leak threshold, the respective control valve closes to prevent communication between the first dryer and the reservoir.

* * * * *

UNITED STATES PATENT AND TRADEMARK OFFICE
CERTIFICATE OF CORRECTION

PATENT NO. : 6,695,893 B2
DATED : February 24, 2004
INVENTOR(S) : Fred W. Hoffman et al.

It is certified that error appears in the above-identified patent and that said Letters Patent is hereby corrected as shown below:

Column 2,
Line 2, please insert -- dried -- following "the" and preceding "air"
Line 6, please delete "on" and insert -- protection --
Line 58, please delete "Drawing" and insert -- Drawings --

Column 8,
Line 36, please delete "dryers" and insert -- dryer --
Line 38, please delete "tion." and insert -- tion; --
Line 41, please delete "dryer." and insert -- dryer, --

Signed and Sealed this

Twenty-ninth Day of June, 2004

JON W. DUDAS
*Acting Director of the United States Patent and Trademark Office*